United States Patent
Guthrie

[11] Patent Number: 6,032,825
[45] Date of Patent: Mar. 7, 2000

[54] LID FOR HOLDING A FROZEN CONFECTION OVER A CUP

[76] Inventor: Christopher L. Guthrie, 4716 Otisco Rd., Henryville, Ind. 47126

[21] Appl. No.: 09/021,082

[22] Filed: Feb. 10, 1998

[51] Int. Cl.[7] ................................................. B65D 25/00
[52] U.S. Cl. .......................... 220/731; 141/340; 220/780; 426/139
[58] Field of Search ..................... 215/392, 393; 220/780, 229, 713, 711, 731, 709, 705, 284, 373; 426/132, 134, 139; 229/932; 141/332, 87, 340

[56] References Cited

U.S. PATENT DOCUMENTS

| | | | |
|---|---|---|---|
| D. 291,620 | 9/1987 | Porchia | D1/105 |
| 641,267 | 1/1900 | Cahill | 141/340 X |
| 811,742 | 2/1906 | Petrie | 215/392 |
| 1,652,789 | 12/1927 | Moore | 426/134 X |
| 1,761,703 | 6/1930 | Brimer | 426/134 X |
| 2,162,224 | 1/1939 | Legge . | |
| 2,213,465 | 9/1940 | Gay | 220/229 |
| 2,321,519 | 5/1943 | Rubinoff . | |
| 2,467,949 | 4/1949 | Thomas | 220/731 X |
| 2,632,708 | 9/1953 | Sueskind . | |
| 2,735,778 | 2/1956 | Taylor . | |
| 2,766,123 | 7/1956 | Moubayed . | |
| 2,785,841 | 3/1957 | Westgate | 215/392 X |
| 2,803,550 | 9/1957 | Ackalusky . | |
| 2,948,452 | 8/1960 | Grogan et al. | 215/392 X |
| 3,088,643 | 5/1963 | Dunn | 426/134 |
| 3,306,512 | 2/1967 | Pagnini | 426/132 X |
| 3,882,630 | 5/1975 | Bianco | 426/134 X |
| 4,639,376 | 1/1987 | Saladino . | |
| 4,714,173 | 12/1987 | Ruiz | 220/709 |
| 4,718,594 | 1/1988 | Harazi | 426/132 X |
| 4,938,411 | 7/1990 | Rizzuto | 426/132 X |
| 5,224,646 | 7/1993 | Biancosino . | |
| 5,397,023 | 3/1995 | Toczek et al. | 220/709 |
| 5,425,471 | 6/1995 | Wendt | 220/705 |
| 5,460,286 | 10/1995 | Rush et al. | 220/709 X |
| 5,515,998 | 5/1996 | Wang . | |

*Primary Examiner*—Stephen P. Garbe
*Assistant Examiner*—Robin Hylton
*Attorney, Agent, or Firm*—Woodard, Emhardt, Naughton Moriarty & McNett

[57] ABSTRACT

A frozen confection holder is provided for use with a circular cup, preferably a plastic "tipper" cup suitable for a child. The frozen confection holder provides a lid mountable to the mouth of a cup, which an annular lip extending from the lid. The lip grips the mouth of the cup. A slot is provided in the lid and is sized and configured to grip a stick attached to a frozen confection. The lid is configured to direct the flow of melted liquid toward a drainage opening defined in the lid. Once the frozen confection on the stick has been consumed by the user, the stick and lid can be removed from the cup and the collected liquid may be sipped directly from the cup.

8 Claims, 2 Drawing Sheets

LID FOR HOLDING A FROZEN CONFECTION OVER A CUP

FIELD OF THE INVENTION

The invention relates generally to frozen confections, and more particularly to a holder for frozen confections which prevents drippage on hands or clothes.

BACKGROUND OF THE INVENTION

A popular confectionery treat among children and adults is a frozen portion of ice cream mounted on a stick such as a POPSICLE® treat. As is well known, these frozen treats melt once removed from the freezer and while being consumed. This melting results in drippings which may get on the hands or clothes, or which may drip on the surrounding areas such as furniture or floors.

This problem is especially prevalent when frozen confections are fed to small children. Small children may not have the awareness or coordination to keep the treats upright and to avoid making a mess. Consequently, there is a need for a device for helping adults and especially children to enjoy frozen treats while avoiding a mess on the person or the surrounding area. Many people also prefer that these drippings be collected so that they may be later sipped by the user.

Prior approaches to these problems have included designs such as the one by Wang in U.S. Pat. No. 5,515,998. Wang illustrates a trough-like dish mounted on a base with a slot for holding a frozen confection. The drippings from the frozen confection are collected by apertures in the dish and can be sipped from a reservoir in the base using a straw. Wang's design is a free-standing pedestal which must be kept upright. The stand may work for some adults, but could be easily knocked over by a young child.

Other designs are illustrated in U.S. Pat. Nos. 5,224,646; 2,632,708 and 2,766,123. These designs provide some protection from dripping and collect the melted treat for later consumption; however, these designs are not necessarily designed for small children and must also be held upright by the user.

Accordingly, there is a need for a frozen confection holder which is conducive for use by small children. It is desirable that the device minimize the need that the holder keep the holder upright and also protects the user and the surroundings from the melted drippings while collecting the drippings for future consumption.

SUMMARY OF THE INVENTION

Briefly describing one aspect of the present invention, there is provided a frozen confection holder for use with a cup with a circular mouth, preferably a "tipper" cup suitable for a child. The frozen confection holder includes a lid mountable to the mouth of the cup, and an annular lip extending from the lid. The lip has an inner circumference that surrounds and grips the mouth of the cup. A slot is provided in the lid and is sized and configured to grip a stick attached to a frozen confection. The lid is configured to direct the flow of melted liquid toward a drainage opening defined in the lid. Once the frozen confection on the stick has been consumed by the user, the stick and lid can be removed from the cup and the collected liquid may be sipped directly from the cup.

Accordingly, it is an object of this invention to provide a frozen confection holder.

It is another object of this invention to provide a frozen confection holder which is suitable for use by adults and children but which is preferably suited for young children.

Still another object of a preferred embodiment of the invention is to provide a frozen confection holder which fits on a standard plastic "tipper" cup.

Further objects features and advantages of the present invention shall become apparent from the detailed drawings and descriptions provided herein.

DESCRIPTION OF THE PREFERRED EMBODIMENT

For the purposes of promoting an understanding of the principles of the invention, reference will now be made to the embodiment illustrated and specific language will be used to describe the same. It will nevertheless be understood that no limitation of the scope of the invention is thereby intended, such alterations, modifications, and further applications of the principles of the invention being contemplated as would normally occur to one skilled in the art to which the invention relates.

Figure 1:
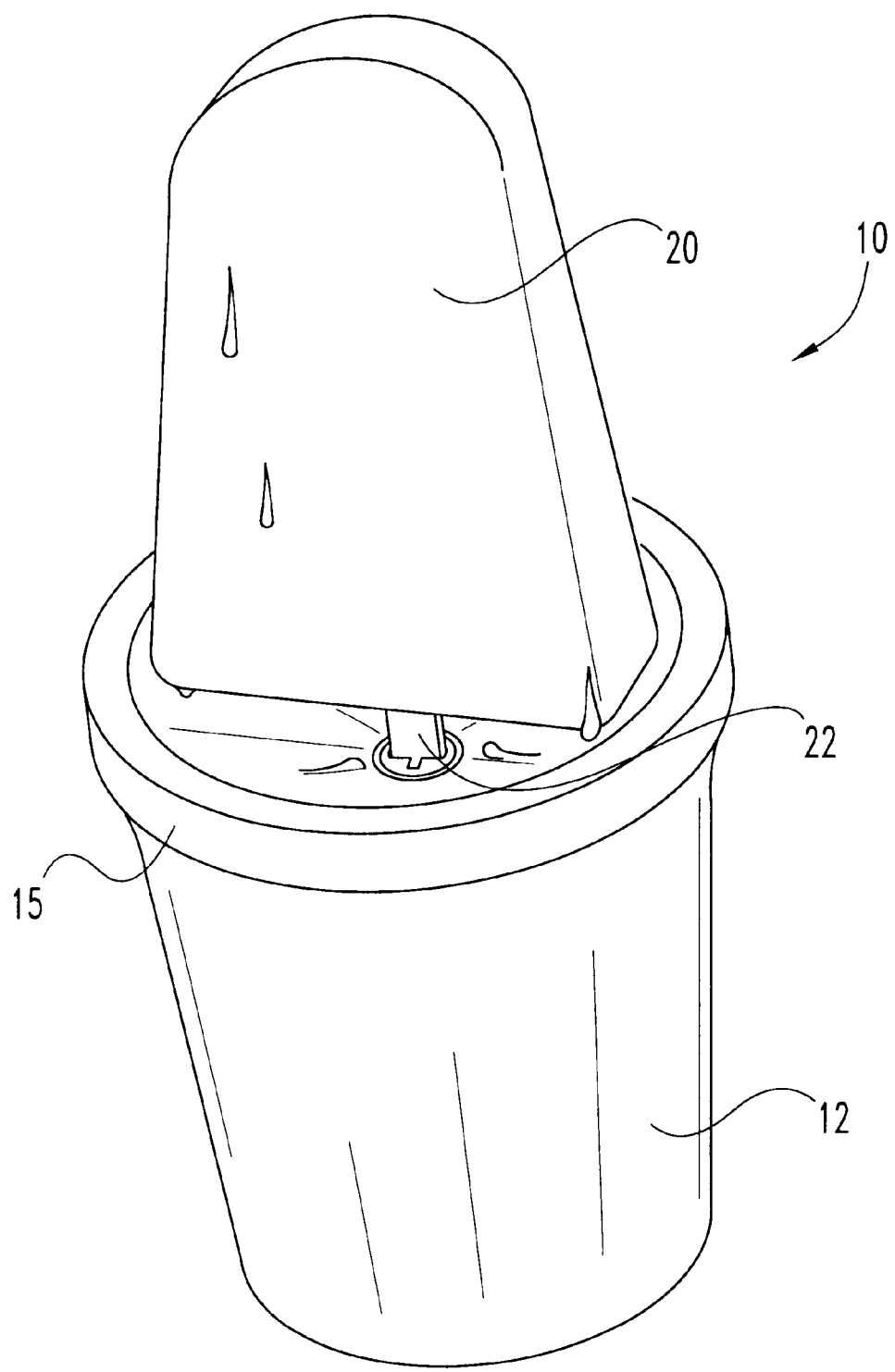
FIG. 1 is a perspective view of a frozen confection and according to a preferred embodiment of the invention.

A preferred embodiment of treat holder 10 is illustrated in FIG. 1. Cup 12 has lid 15 mounted to the circular mouth of the cup. Frozen confection 20 mounted on stick 22 is situated and held upright by confection holder 10. Although usable with standard drinking cups, cup 12 is preferably a plastic "tipper" training cup for a child. Examples of these cups are the Easy Feeding™ Dripless Cups from Playschool®, the Tupperware® Bell Tumbler Cups and the First Years™ Trainer Tumbler Cups. These cups have a standardized circular mouth, and are sized to be easy for children to grip and hold.

Frozen confection 20 could, for example, be a Popsicle® treat. Other alternatives could include frozen ice cream, frozen yogurt, or flavored ice mounted on stick 22. These treats could be plain or have a sweet coating such as a chocolate shell. These frozen confections and similar treats are well known in the art.

Figure 2:
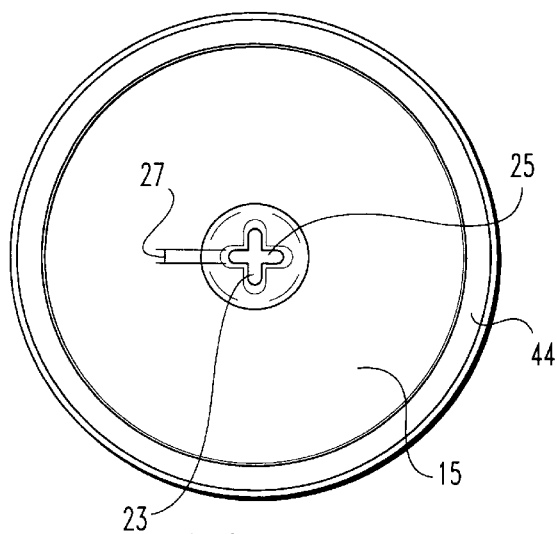
FIG. 2 is a top down view of a preferred embodiment of the invention.

FIG. 2 illustrates a top view of lid 15 of frozen confection holder 10. Situated in the center of lid 15 is an opening 25, where stick 22 of frozen confection 20 may be placed. Opening 25, has width 27 and a height sufficient to hold stick 22 upright. Lid 15 also has at least one drainage opening 23 for the drainage of collected drippings into cup 12. In a preferred embodiment, opening 25 and drainage opening 23 are connected to form one opening having a cross-section of crossed slots. Width 27 of opening 25 is sized to fit and grip a standard stick 22 of a frozen confection. Preferably width 27 is between about 0.07 inches and about 0.15 inches. More preferably width 27 is between about 0.08 inches and about 0.11 inches. In an alternate preferred embodiment, opening 25 may have width 27 wider at the top entrance and tapering to a narrower width in the lower portions of the opening. This taper allows easier introduction of the stick into the opening while retaining the gripping property once the stick is inserted.

Figure 3:
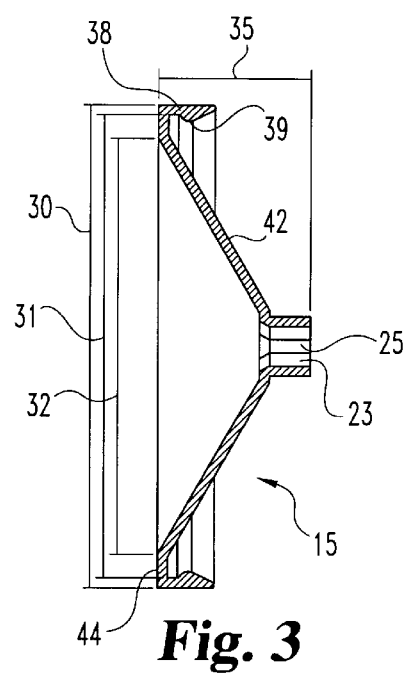
FIG. 3 is a side cut-away view of a preferred embodiment of the invention.

A cross-sectional view is illustrated in FIG. 3. In FIG. 3, lid 15 is shown with annular ring 38 extending around the circumference of lid 15. Lip 38 has at least one node 39 on its inner circumference. Node 39 is preferably a ring extending around lid 15. Lid 15 has slanting portions 42 for collecting the drippings from the frozen confection and directing the flow of the liquid into drainage opening 23. In a preferred embodiment, there may be a taper from the inner diameter of node 39 to the lower part of lip 38.

Lid 15 is made from a plastic or rubber type of material as is well understood in the art. Lip 38 has an outer circumference with preferred outer diameter 30 between about 2.8 and 3.2 inches, preferably wider than the frozen treat. Inner circumference 31 of lip 38 has a diameter preferably between about 2.5 inches and about 3.1 inches and more preferably between about 2.8 inches and about 3.0 inches. In a preferred embodiment, lid 15 has flat portion 44 around the top circumference of lid 15. Flat portion 44 extends from the outer circumference of lid 15 inward to the beginning of slanting portion 42. Inner diameter 32 of flat portion 44 is preferably about 2.6 inches. Further in a preferred embodiment, lid 15 has a thickness of approximately 0.0625 inches.

Figure 4:
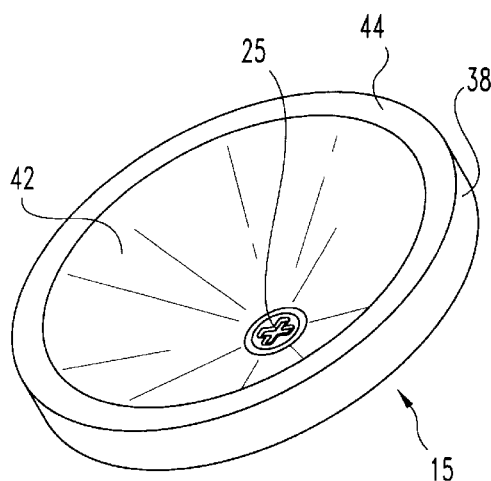
FIG. 4 is a perspective cut-away view of a preferred embodiment of the invention.

In a most preferred embodiment, lip 38 has an outer diameter 30 equal to 3.0125 inches and inner diameter of 2.8875 inches. Lip 38 extends 0.3500 inches from the top of lid 15 and has node or ring 39 at 0.1892 inches from the top of lid 15. Ring 39 may have an inner circumference of 2.8125 inches. Lip 38 is topped by flat portion 44 which extends from outer diameter 30 to diameter 32 of 2.5915 inches. Opening 25 is in the center of lid 15 and has width 27 of 0.0840 inches. Opening or slot 25 has height 35 of 0.9375 inches from flat portion 44 to the lower and of opening 25. A preferred embodiment is further illustrated in FIG. 4 showing a perspective top view of lid 15. Lip 38 extends from the circumference of lid 15 and is topped by flat portion 44. Flat portion 44 transitions into slanted portion 42 which directs the flow of liquid into drainage holes 23. Preferably drainage hole 23 is combined with stick opening 25.

Figure 5:
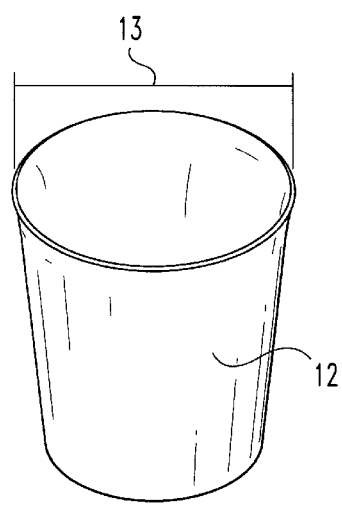
FIG. 5 is a perspective view of a cup used in a preferred embodiment of the invention.

FIG. 5 illustrates a perspective view of cup 12. Cup 12 has an outer circumference around the circular mouth with outer diameter 13. Outer diameter 13 is preferably between about 2.5 inches and about 3.1 inches and more preferably between about 2.8 inches and about 3.0 inches. The mouth of cup 12 may have an outer lip which lid 15 fits or snaps over.

In operation, lid 15 is placed upon cup 12. Cup 12 is preferably a self-righting child's cup which is easy for a child to grip and hold upright. Lid 15 fits atop the circular mouth of cup 12 and sealingly engages it with lip 38. A snap fit over the lip on cup 12 may also be used. Ring 39 provides a frictional fit which seals lid 15 against cup 12 around the circumference of the mouth of the cup. Stick 22 having frozen confection 20 is then placed in slot 25 of lid 15. The child then begins to consume the frozen confection. While the confection is being consumed, the melting liquid or drippings from the confection are collected on top of lid 15 and are directed by slanting portions 42 into drainage opening 23. Once the child has completed the confection, lid 15 and stick 22 are removed. The melted drippings may then be sipped from the lip of the cup. Confection holder 10 may then be cleaned.

While the invention has been illustrated and described in detail in the drawings and foregoing description, the same is to be considered as illustrative and not restrictive in character it being understood that only the preferred embodiment has been shown and described and that all changes and modifications that come within the spirit of the invention are desired to be protected.

What is claimed is:

1. A lid for holding a frozen confection over the circular mouth of a cup, said lid comprising:
    (a) a rim portion sized to cover the rim that defines the mouth of a cup;
    (b) an annular lip extending from said rim portion, said lip having an inner and an outer circumference, wherein said inner circumference is sized to surround and grip the rim of the cup;
    (c) an aperture in said lid for holding a stick attached to a frozen confection;
    (d) at least one drainage opening in said lid; and
    (e) a downward sloping portion to direct the flow of melted liquid from the rim portion to the drainage opening;
    wherein said aperture and said drainage opening are connected to form one opening having a cross-section of crossed slots.

2. The frozen confection holder of claim 1 wherein the inner circumference of said lip has a diameter between about 2.5 inches and about 3.1 inches.

3. The frozen confection holder of claim 2 wherein the inner circumference of said lip has a diameter between about 2.8 inches and about 3.0 inches.

4. The frozen confection holder of claim 2 wherein said aperture includes a slot with a width of between about 0.07 inches and about 0.15 inches.

5. The frozen confection holder of claim 4 wherein said slot had a width of between about 0.08 inches and about 0.11 inches.

6. The frozen confection holder of claim 1 and further comprising at least one node on said inner circumference of said lip for sealably gripping the cup.

7. The frozen confection holder of claim 6 wherein said node is a ring on said inner circumference.

8. A frozen confection holder comprising:
    (a) a cup; and
    (b) a lid, comprising:
        (i) a rim portion sized to overlay the rim of said cup;
        (ii) a lip extending from said rim to surround and grip the mouth of said cup;
        (iii) an aperture in said lid for holding a stick attached to a frozen confection;
        (iv) at least one drainage opening in said lid to allow melted liquid to pass through the lid to the cup; and
        (v) a downward sloping portion to direct the flow of melted liquid from the rim to the drainage opening;
    wherein said aperture and said drainage opening are connected to form one opening having a cross-section of crossed slots.

* * * * *

UNITED STATES PATENT AND TRADEMARK OFFICE
CERTIFICATE OF CORRECTION

PATENT NO. : 6,032,825
DATED : March 7, 2000
INVENTOR(S) : Guthrie

Page 1 of 1

It is certified that error appears in the above-identified patent and that said Letters Patent is hereby corrected as shown below:

<u>Title page, Item [56],</u>
References Cited, please delete "1/1939" by Legge and insert in lieu thereof -- 1/1938 --.

References Cited, please delete "5/1943" by Rubinoff and insert in lieu thereof -- 5/1941 --.
References Cited, please delete "9/1953" by Sueskind and insert in lieu thereof -- 9/1951 --.
References Cited, please delete "7/1956" by Moubayed and insert in lieu thereof -- 7/1954 --.
References Cited, please delete "9/1957" by Ackalusky and insert in lieu thereof -- 9/1955 --.

<u>Column 3,</u>
Line 33, please delete "and" insert in lieu thereof -- end --.

Signed and Sealed this

Thirteenth Day of November, 2001

Attest:

*Attesting Officer*

NICHOLAS P. GODICI
*Acting Director of the United States Patent and Trademark Office*

UNITED STATES PATENT AND TRADEMARK OFFICE
CERTIFICATE OF CORRECTION

PATENT NO.    : 6,032,825
DATED         : March 7, 2000
INVENTOR(S)   : Guthrie

It is certified that error appears in the above-identified patent and that said Letters Patent is hereby corrected as shown below:

<u>Title page,</u>
Item [56], References Cited, please delete "1/1939" by Legge and insert in lieu thereof -- 1/1938 --.
Please delete "5/1943" by Rubinoff and insert in lieu thereof -- 5/1941 --.
Please delete "9/1953" by Sueskind and insert in lieu thereof -- 9/1951 --.
Please delete "7/1956" by Moubayed and insert in lieu thereof -- 7/1954 --.
Please delete "9/1957" by Ackalusky and insert in lieu thereof -- 9/1955 --.

<u>Column 3,</u>
Line 33, please delete "and" and insert in lieu thereof -- end --.

Signed and Sealed this

Sixteenth Day of July, 2002

*Attest:*

JAMES E. ROGAN
*Attesting Officer*      *Director of the United States Patent and Trademark Office*